United States Patent
Miyazaki et al.

[11] Patent Number: 5,987,091
[45] Date of Patent: *Nov. 16, 1999

[54] X-RAY CT SYSTEM

[75] Inventors: Osamu Miyazaki, Kita-Souma-gun; Shinichi Migita, Ryugasaki; Tetsuo Nakazawa, Kashiwa, all of Japan

[73] Assignee: Hitachi Medical Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/897,530

[22] Filed: Jul. 21, 1997

[30] Foreign Application Priority Data

Jul. 23, 1996 [JP] Japan ................................. 8-193612

[51] Int. Cl.$^6$ ............................................. A61B 6/03
[52] U.S. Cl. .............................. 378/15; 378/4; 378/901
[58] Field of Search .................... 378/4, 15, 19, 378/901

[56] References Cited

U.S. PATENT DOCUMENTS

| 4,280,178 | 7/1981 | Nassi et al. | 378/14 |
| 4,740,896 | 4/1988 | Horiba et al. | 378/4 |

*Primary Examiner*—David Vernon Bruce
*Attorney, Agent, or Firm*—Oliff & Berridge, PLC

[57] ABSTRACT

Projection data having a phase difference of 180° from each other, which are obtained through a ¼ offset detector, are arranged alternately to obtain projection data of the high resolution, and a CT image is reconstructed on the basis of the projection data of the high resolution. Opposition difference data showing the difference between the projection data having the phase difference of 180° from each other and having a phase difference of 180° from each other are alternately arranged to obtain the opposition difference data of the high resolution, and an opposition difference image is reconstructed on the basis of the opposition difference data of the high resolution. Then, distortion components showing the high-frequency component are extracted from the aforesaid opposition difference image, and the aforesaid reconstructed CT image is corrected by the thus extracted distortion components, so that motion artifacts contained in the original CT image can be reduced.

10 Claims, 10 Drawing Sheets

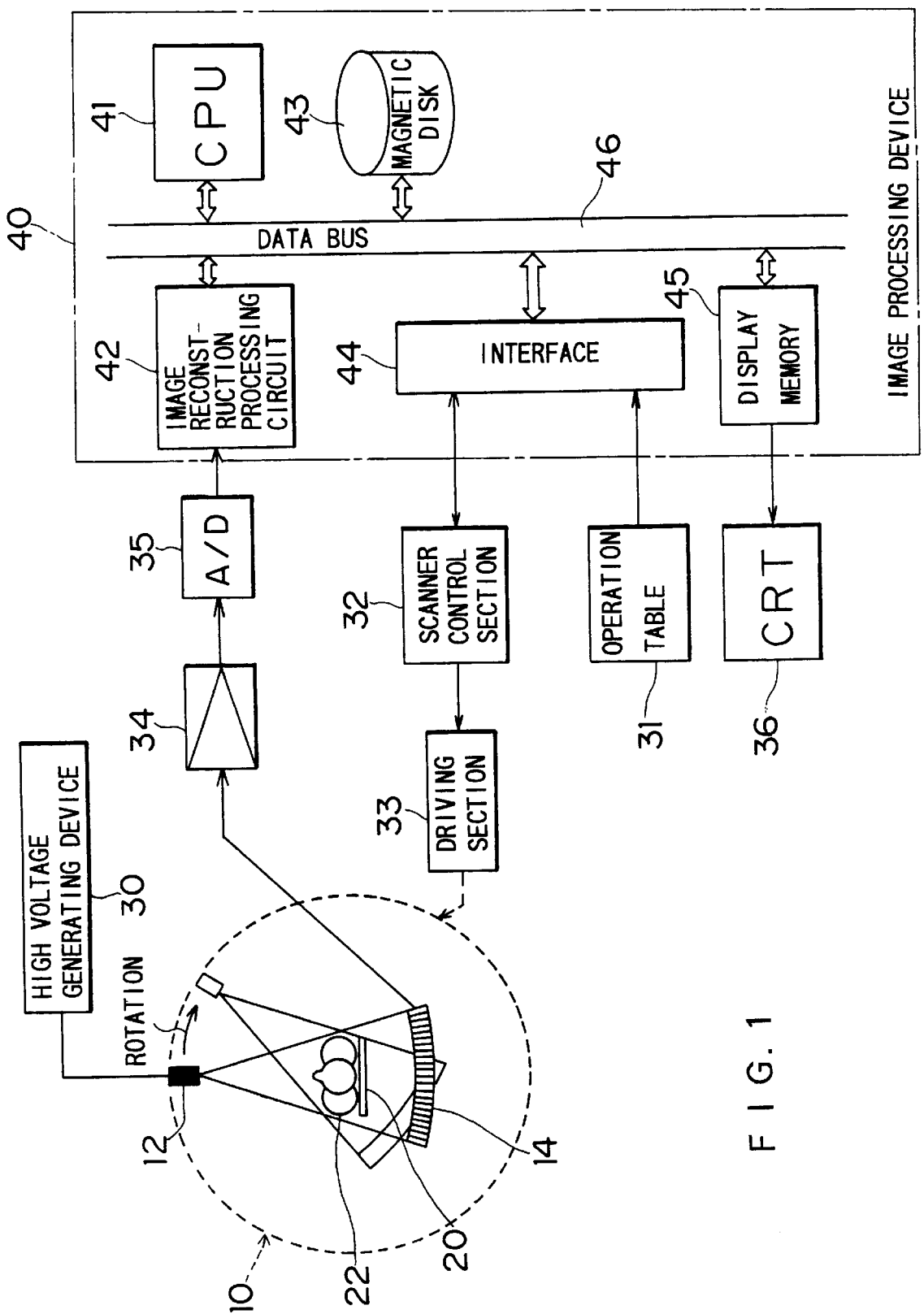
F I G. 1

X-RAY CT SYSTEM

BACKGROUND OF THE INVENTION

1. Field of the Invention

The present invention relates generally to a method for reconstructing an image and an X-ray CT system, and particularly to a method of reconstructing an image and an X-ray CT system, in which the motion artifacts are reduced and the resolution is high.

2. Description of Related Art

There are various algorithms in the image reconstructing process in the X-ray computed tomography (CT), and the most commonly used algorithm at present is a back projection method. According to the back projection method, fuzziness of the image caused by the back projection process is controlled by applying high-frequency components emphasizing filtration to projection data. The back projection method includes the filtered back projection method performed through multiplying by a filter function in the frequency space and the convolution back projection method performed by the convolution process in the real space.

The filter function used in the above-described back projection method is referred to a reconstructing filter, and the Ramachandran filter and the Shepp & Logan filter as shown in FIG. 4 are normally used.

FIG. 5 is a flow chart showing the conventional process of the filtered back projection method. As shown in FIG. 5, preprocessing, which includes sensitivity corrections for uneven detector cell sensitivities and gains, intensity corrections for variations in X-ray beam, beam hardening corrections, scattered ray corrections, conversion of the data to logarithmic form and the like, is applied to the acquired projection data (Step S10), thereafter, fuzziness of the back projection is corrected in advance by a filtering process (Step S13), and a tomographic image is obtained by a back projection process (Step S14). Further, there may be a case where an image filter is applied to the tomographic image as an after-processing to thereby obtain a final image (Step S15). The image characteristics of the tomographic image obtained as described above rely upon the frequency characteristics of the reconstruction filter, so that, in the X-ray CT system, there are provided various types of filter functions suitable for the respective scanned portions.

However, the spatial resolution in the X-ray CT system is governed by the cell interval and aperture of the detector, and the resolution more than that has been difficult to realize theoretically. Thus, the spatial resolution determined by the cell interval has heretofore been bettered by the improvements in the acquiring method and algorithm.

The conventional high resolution algorithm will hereunder be described. One of the important techniques is a method, in which the redundancy of a fan beam CT scanning is skillfully utilized, i.e., a method, in which acquiring is performed by a ¼ offset detector which is shifted from a straight line connecting an X-ray tube to the center of rotation by ¼ of the cell interval, so that a sample position of data opposed thereto through 180° in the direction of channel is shifted by ½ pitch of the cell interval as compared with the initial position.

That is, as shown in FIG. 6 (A), when a fan beam angle is ±α and a projection angle is β, the opposition data of a fan beam projection A at a certain angle (projection angle β) is represented by a straight line B. The opposition data at a certain channel position ai are associated with the same black ball on the straight line B, and similarly, indicate the data of two white balls which are opposed to each other.

Furthermore, as shown in FIG. 6 (B), in a case of performing the scanning by use of a ¼ offset detector, when the opposition data of the above-described channel position $\alpha_i$ are considered, the position of $-\alpha_i$ falls under the cell border of the detector. These relations are true of all of the channel positions. Accordingly, the same result is obtained by sampling in the direction of a at the ½ pitch of the cell interval of the ¼ offset detector.

Another of the important techniques is that the precision data, in which the cell interval of the ¼ offset detector is made smaller, is calculated from the acquired data by calculation (oversampling), and a large bandwidth process is applied in the process thereafter.

It is most effective when these two techniques are used simultaneously. That is, this is the method, in which the data positioned between the detecting cells are calculated from the opposition data obtained by the offset acquiring, and the thus obtained result is processed by the large bandwidth process.

When it is intended to calculate the opposition interpolation data of the fan beam projection A at a certain angle (projection angle β), if the cell interval of the ¼ offset detector is Δα, then the opposition interpolation data coming between $P(\alpha_i, \beta)$ and $P(\alpha_{i+1}, \beta)$ as shown in FIG. 7 are shifted by $\Delta\alpha/2$, so that $P(\alpha_i+\Delta\alpha/2, \beta)$ is obtained. Accordingly, the side of the opposition data represented by $-(\alpha_i+\Delta\alpha/2)$, which is just at the cell center of the ¼ offset detector and corresponds to the sample position in the direction of α.

Actually, correspondence with the sample position in the direction β rarely takes place, so that the opposition data can be calculated by the interpolation process in the direction of β. This process is carried out over all of the channels, and, as shown in FIG. 8, the opposition interpolation data (high resolution data) P of ½ pitch of the cell interval of the ¼ offset detector can be obtained from 0° data P1 and 180° data P2. When the ¼ offset detector is used as described above, the opposition interpolation data P can be calculated without the interpolation process in the direction of channel, which is important for the resolving power, so that it becomes more effective.

Here, this method is referred to an opposed beam interpolation method. It is known that the spatial resolution can be improved by 25% effectively by the opposed beam interpolation method. FIG. 9 is a flow chart showing the high resolution process in a case of a fan beam direct back projection. As compared with the flow chart shown in FIG. 5, the above-described opposed beam interpolation process (Step S12) is added. Furthermore, FIG. 10 is a flow chart showing the high resolution process in a case of a parallel beam arrangement back projection. As compared with the flow chart shown in FIG. 5, a parallel beam transformation process (Step S11) and the opposed beam interpolation process (Step S12) are added.

However, the high resolution image can be obtained by the opposed beam interpolation process, but, the data opposed to each other through 180° have a shift (phase difference) of about ½ scan time. Thus, due to the movements of body and internal organs such as heart beat, respiration and peristaltic movements of bowels, the opposed data may not correspond with the data which are naturally obtained. Furthermore, in the actual scanning, the acquiring is one, in which an area having the spreading toward the detecting cells from the focus is scanned, so that it is difficult to achieve an accurate correspondence. Particularly, in a cross-section where there are small bones as in a head, there may occur an offset portion due to the contradiction between the both. Further, in the most commonly used filtered back projection method among the image reconstruction processes of the X-ray CT system, errors between both are emphasized for applying the high-frequency components emphasizing type filter, and on the reconstructed image, there may take place the streak-shaped artifacts and moire patterns. Furthermore, a shift in position may take place in the focus of an X-ray source due to the change in temperature, and also there may be cases where similar streak-shaped artifacts and moire patterns take place due to the distortions caused by the instrumentation geometry.

On the other hand, in order to control the partial volume effect and to obtain highly accurate data, the scanning may be performed by use of thin slices. In this case, since the efficiency of utilization of X-rays is lowered and image noises are greatly increased, such problems are presented that it is not suitable for observing the lesion having no difference in contrast and, when the high resolution algorithm is applied, the image noises are particularly emphasized.

SUMMARY OF THE INVENTION

The present invention has been developed in view of the above-described circumstances, and has its object the provision of an image reconstruction method and an X-ray CT system, which are capable of controlling motion artifacts which may appear along with the high resolution process when a ¼ offset detector is used.

To achieve the above-mentioned object, an X-ray CT system according to the present invention comprises: a scanner section having an X-ray source and a ¼ offset detector and being rotatable about an isocenter, the X-ray source and the ¼ offset detector facing each other across the isocenter; an opposition difference data calculating means for calculating opposition difference data representing a difference between projection data having a phase difference of 180° from each other, the projection data being acquired through the ¼ offset detector; an opposed beam interpolating means for alternately arranging the projection data having a phase difference of 180° from each other to obtain projection data of the high resolution of ½ pitch of the cell interval of the ¼ offset detector, and for alternately arranging the opposition difference data having the phase difference of 180° from each other to obtain opposition difference data of the high resolution; an image reconstruction calculating means for reconstructing a CT image on the basis of the multi-directional projection data of the high resolution obtained at respective rotational positions of the scanner, and for reconstructing an opposition difference image on the basis of the multi-directional opposition difference data of the high resolution; a distortion component discriminating means for discriminating distortion components in the opposition difference image; and a correcting means for correcting the reconstructed CT image by use of the distortion components.

That is, the difference between the projection data having the phase difference of 180° from each other is calculated, an opposition difference image is reconstructed on the basis of the opposition difference data, distortion components causing the artifacts are discriminated from the reconstructed opposition difference image, and the discriminated distortion components are caused to act on the original CT image reconstructed by the high resolution process, so that an image having reduced artifact and satisfactory resolving power can be reconstructed.

Furthermore, another embodiment according to the present invention comprises: a scanner section having an X-ray source and a ¼ offset detector and being rotatable about an isocenter, the X-ray source and the ¼ offset detector facing each other across the isocenter; an opposed beam interpolating means for alternately arranging projection data having a phase difference of 180° from each other to obtain projection data of the high resolution of ½ pitch of the cell interval of the ¼ offset detector, the projection data being acquired through the ¼ offset detector; an opposition difference data calculating means for calculating opposition difference data representing a difference between projection data having a phase difference of 180° from each other, the projection data being acquired through the ¼ offset detector; a distortion component discriminating means for discriminating distortion components of the opposition difference data; a correcting means for correcting the projection data of the high resolution by use of the distortion components; and an image reconstruction calculating means for reconstructing a CT image on the basis of the projection data of the high resolution corrected by the correcting means.

With this arrangement, by directly applying distortion correction to the acquired data, it is not necessary to perform the high resolution reconstruction calculation twice, so that the time for calculation can be greatly shortened.

Incidentally, in this specification, the terms of "extraction" and "emphasis" are defined generally as "discrimination".

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein:

FIG. 1 is a block diagram showing the general construction of an X-ray CT system according to the present invention;

FIG. 6 (A) and FIG. 6(B) are drawings connected with the opposed data having a phase difference of 180° from each other, which are acquired through the ¼ offset detector;

DETAILED DESCRIPTION OF THE PREFERRED EMBODIMENTS

Figure 2:
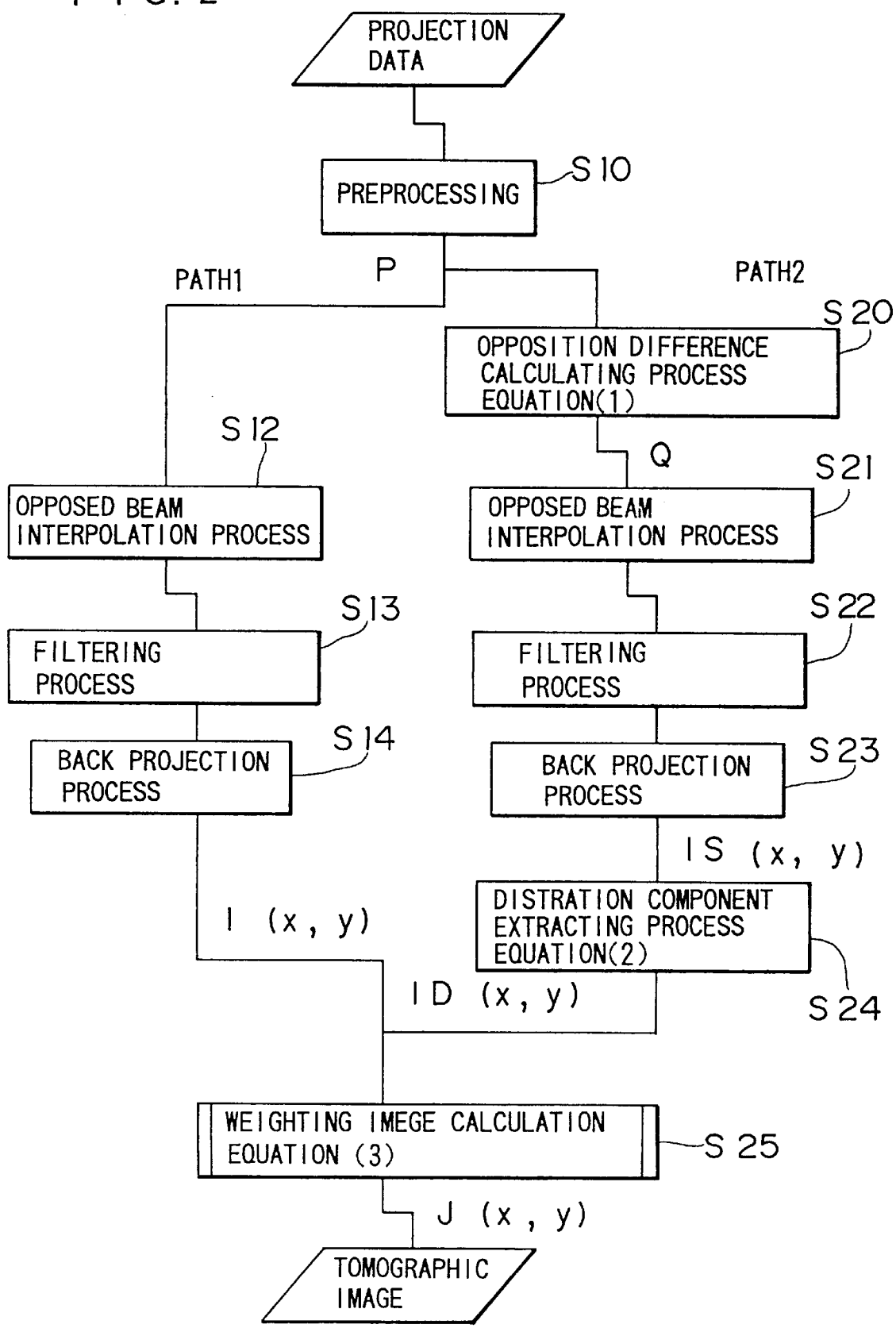
FIG. 2 is a flow chart used for explaining a first embodiment of an image reconstruction method according to the present invention.

The invention will be described in further detail by way of example with reference to the accompanying drawings.

FIG. 1 is the block diagram showing the general construction of the X-ray CT system according to the present invention. As shown in FIG. 1, this X-ray CT system includes a CT scanner section 10, a bed 20, a high voltage generating device 30 and an image processing device 40.

In the CT scanner section 10, an X-ray tube 12 and a ¼ offset detector 14 are disposed in a positional relationship of being opposed to each other through 180°, and a body to be inspected 22 rested on the bed 20 is provided therebetween. Then, normally, in response to instructions inputted from an operation table 31, a control signal necessary for a CT scan is applied to a scanner control section 32 through the image processing device 40, and the bed 20 and the high voltage generating device 30 are controlled and the CT scan is carried out. That is, when the scan is started, high voltage is applied to the X-ray tube 12 from the high voltage generating device 30 and X-rays are radiated onto a scan plane of the body to be inspected 22 from the X-ray tube 12.

The X-rays which were radiated onto the body to be inspected 22 and passed therethrough are changed into electrical signals according to the transmitted quantity of X-rays by the ¼ offset detector 14 and inputted into the image processing device 40 through a pre-amplifier 34 and an A/D converter 35.

The image processing device 40 includes a central processing unit (CPU) 41 for controlling the X-ray CT system as a whole, an image reconstruction processing circuit 42 for performing the image reconstruction calculation, a magnetic disk 43, an interface 44, a display memory 45 and so forth, all of which are connected to a data bus 46.

The X-ray transmission data (hereinafter referred to as "projection data") input by the aforesaid scanning is applied thereto with the process of calculating opposition difference data, which will be described later, an opposed beam interpolation process, a filtering process, a distortion component extracting process, a process of correcting the CT image by use of the distortion components and so forth by the image reconstruction processing circuit 42, so that the CT image of the high resolution having reduced artifact can be reconstructed. The thus reconstructed CT image is transmitted to the display memory 45 through the data bus 46, displayed on a CRT monitor 36 and stored in the magnetic disk 43 for displaying again and so forth.

The component of the process of the above-described image reconstruction processing circuit 42 will hereunder be described.

Figure 9:
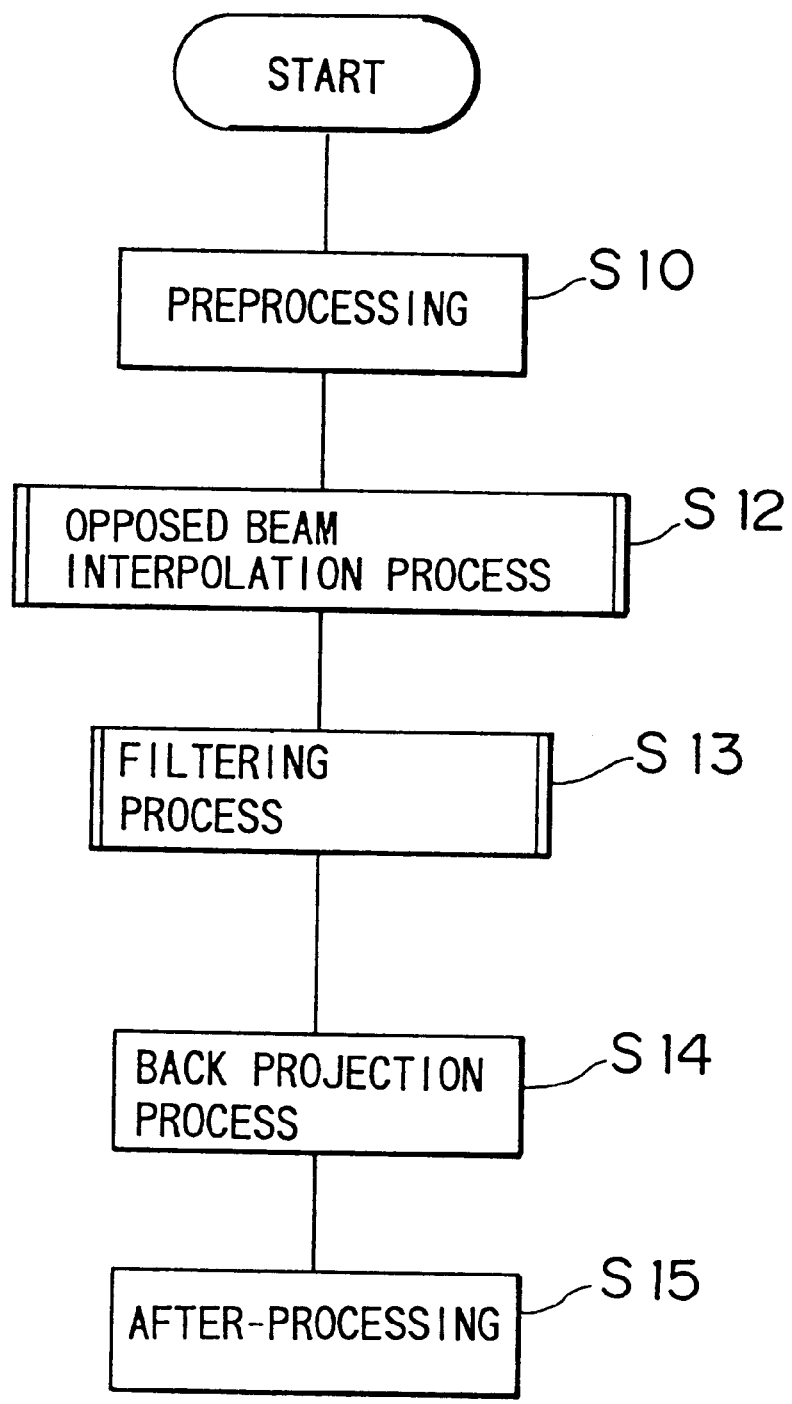
FIG. 9 is a flow chart showing a high resolution process in a direct method.
Figure 10:
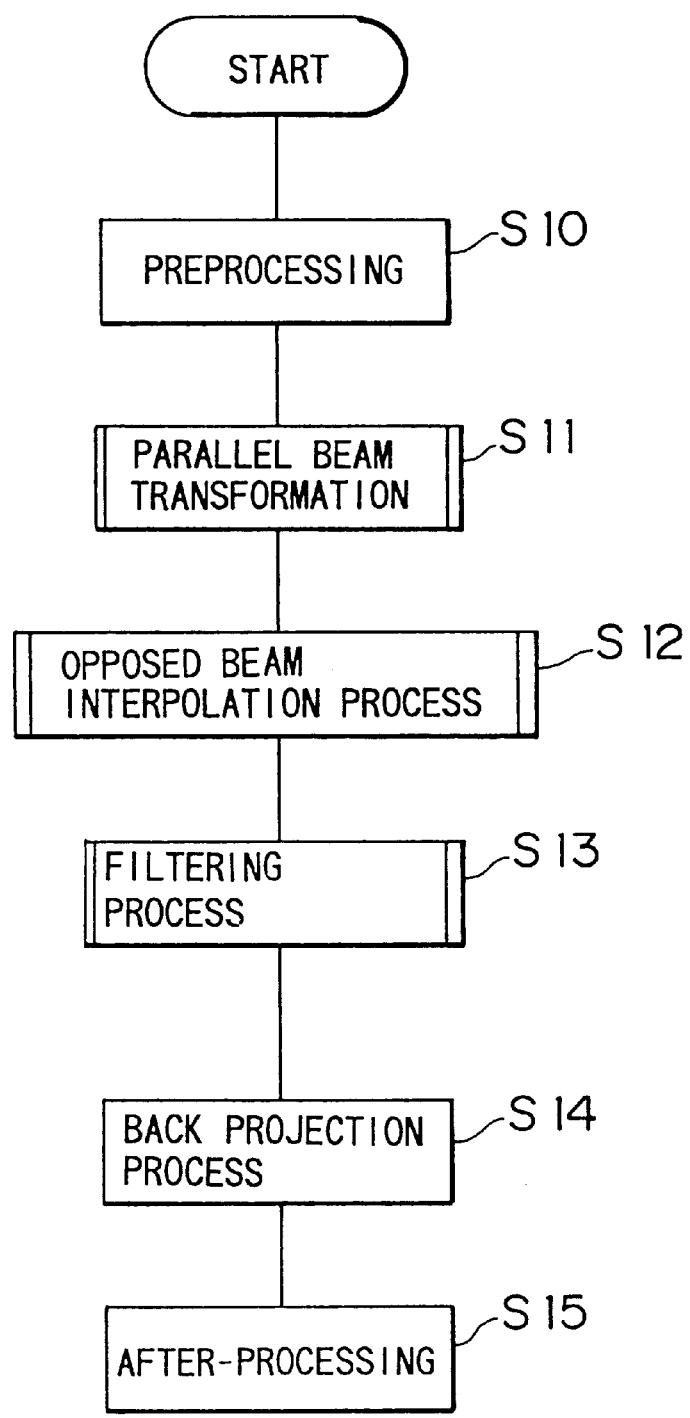
FIG. 10 is a flow chart showing the high resolution process in an arrange method.

FIG. 2 is a flow chart showing the first embodiment of the image reconstruction method according to the present invention. In FIG. 2, after the preprocessing of the acquired projection data (Step S10), Path 1 including an opposed beam interpolation process (Step S12), a filtering process (Step S13) and a back projection process (Step S14) obtains a CT image I(x, y) of the high resolution similarly to the flow of the conventional high resolution process as shown in FIG. 9.

In contrast thereto, in the first embodiment of the present invention, Path 2 and Step S25 are added. Path 2 includes a calculating process of opposition difference data (Step S20), an opposed beam interpolation process (Step S21), a filtering process (Step S22), a back projection process (Step S23), and a distortion component extracting process (Step 24).

Firstly, the process of calculating opposition difference data (Step S20) will be described.

Figure 7:
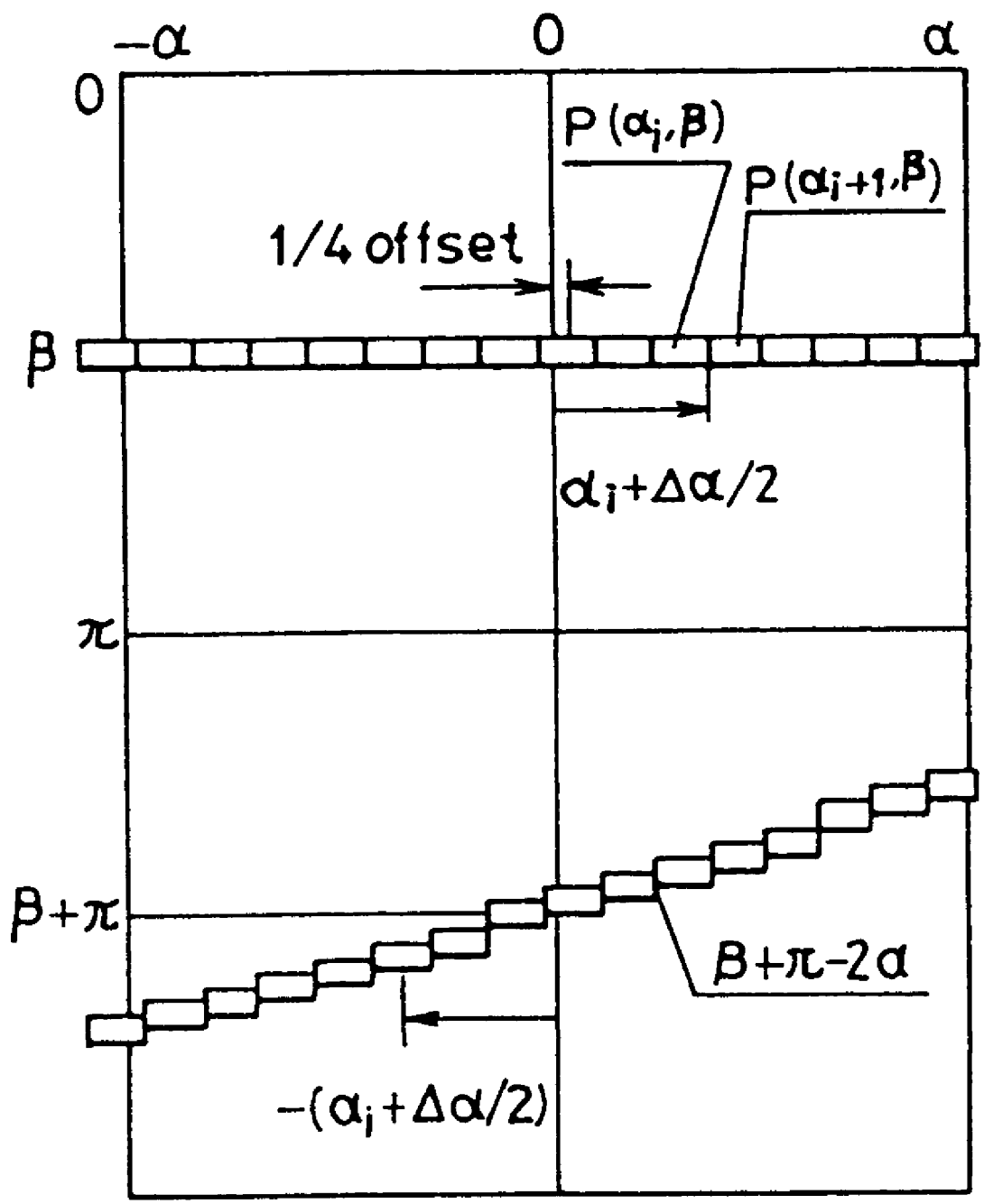
FIG. 7 is a view explaining an interpolation process of the opposed data.

The opposition data to be calculated here are not the data for performing the interpolation as shown in FIG. 7, but, are the data having the transmitting course on the tomographic image, which is common with the data themselves for taking the difference. That is, when a certain X-ray beam is made to be $P(\alpha_i, \beta)$, $P(-\alpha_i, \beta+\pi+2\alpha_i)$ is calculated by the interpolation in a space $\alpha$-$\beta$. Then, a difference data Q between both are made to be opposition difference data. Here, the opposition difference data Q is represented by the following equation:

$$Q(\alpha_i,\beta)=P(\alpha_i,\beta)-P(-\alpha_i,\beta+\pi+2\alpha_i). \qquad (1)$$

However, when $\beta$ exceeds the range of 0 to $2\pi$, in a case where continuous scanning is made as in the helical scan or dynamic scan, data of another scan period may be used or the range of 0 to $2\pi$ may be utilized circulatingly. The opposition difference data can be obtained by calculating Q for all of $\alpha$ and $\beta$, and, it is possible to thin out $\alpha$ and $\beta$ or to restrict the range of construction, but, thinning out is not desirable in view of the effect of correction.

Subsequently, the opposed beam interpolation process (Step S21) is performed from the aforesaid opposition difference data of the 0° data and the aforesaid opposition difference data of the 180° data. The opposition difference data which were high resolution processed by the opposed beam interpolation method is subjected to the filtering process and the back projection process, whereby the opposition difference image is obtained (Steps S22, S23).

Next, the distortion component extraction process in Step S24 will be described. The opposition difference image which is obtained by the high resolution reconstructing of the opposition difference data includes the moire patterns and the streak-shaped artifacts, which are included in the original image, due to the above-described distortion. However, because the information of the body to be inspected is included from the viewpoint of the experiment, if all is calculated by weighting, then the resolving power is lowered greatly. The present invention is characterized in that further the filtering process is applied and only the high-frequency components considered to be governed by the distortion components is extracted, whereby only the distortion components are taken out.

In this embodiment, extraction of the distortion components is realized by the image filter. That is, the high-frequency components of the opposition difference image IS(x, y) obtained by the back projection process in Step S23 are controlled by use of a gauss filter and the like, whereby the high-frequency controlled image is extracted from the original opposition difference image, so that a distortion image ID(x, y), in which only the high-frequency components of the opposition difference image is extracted, can be obtained. When this is expressed in an equation, the following equation can be obtained:

$$ID(x, y) = IS(x, y) - \sum_{i=-m}^{m} \sum_{j=-n}^{n} W_{ij} \cdot IS(x + i, y + j) \qquad (2)$$

where $W_{ij}$ is a weighting factor of the filter.

Further, the distortion image ID(x, y), which is weighted, is subtracted from the original image I(x, y) by the following equation, so that the final image J(x, y) can be obtained (Step S25):

$$J(x,y)=I(x,y)-C \cdot ID(x,y) \qquad (3)$$

where C is a weighting factor for controlling the correction effect and $0<C \leq 1$. Experimentally, when C is about 0.5, a satisfactory result can be obtained.

Next, description will be given of the second embodiment of the image reconstruction method according to the present invention with reference to the flow chart shown in FIG. 3.

In the above-described first embodiment, distortion has been corrected by weighting applied to the distortion components. However, since the high resolution reconstruction should be performed twice, there may be cases where it is difficult to mount on the CT system in view of the time of calculation. In the second embodiment, distortion correction is directly applied to the projection data, so that the time of calculation can be greatly shortened.

Figure 3:
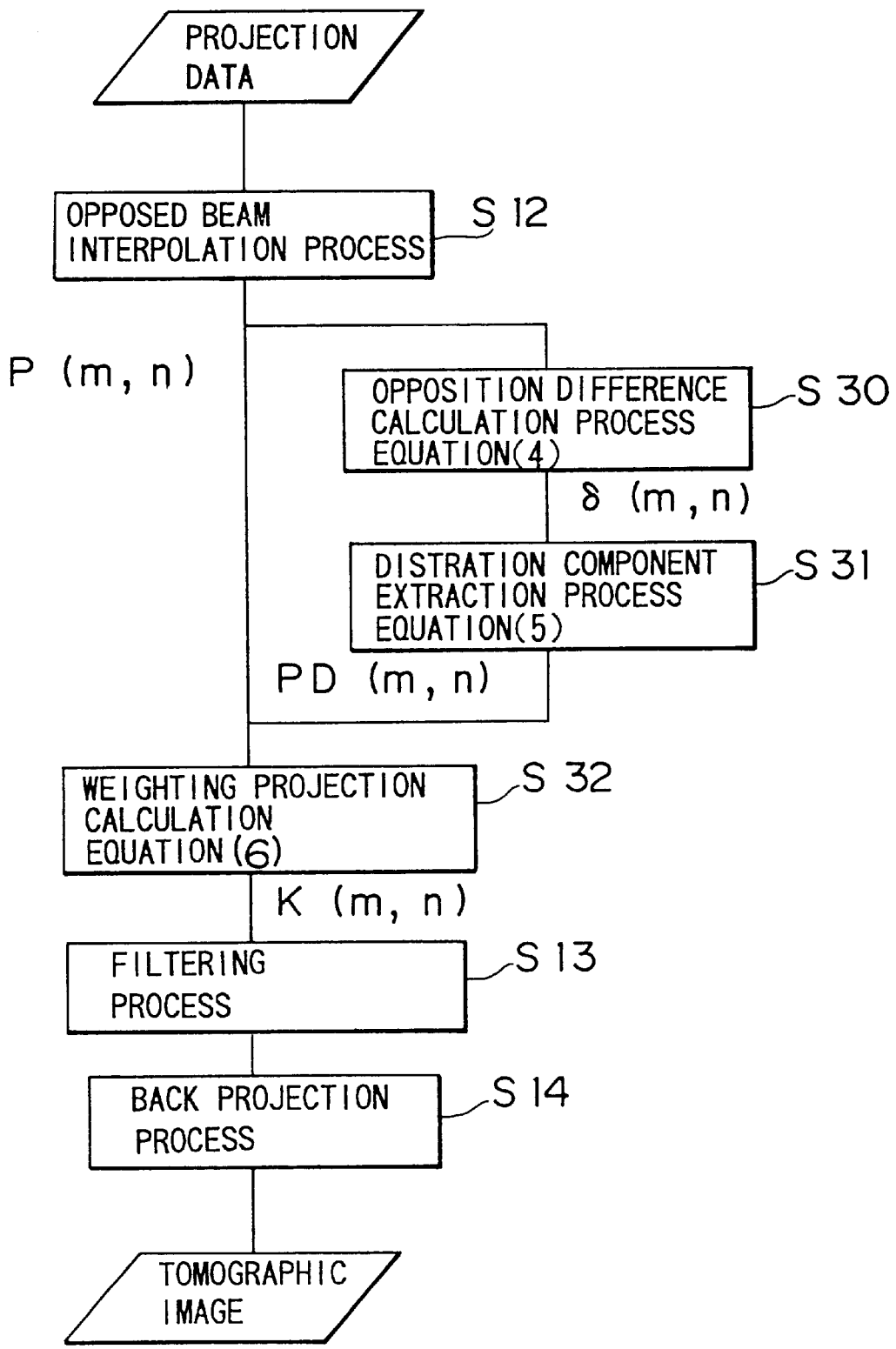
FIG. 3 is a flow chart used for explaining a second embodiment of an image reconstruction method according to the present invention.
Figure 4:
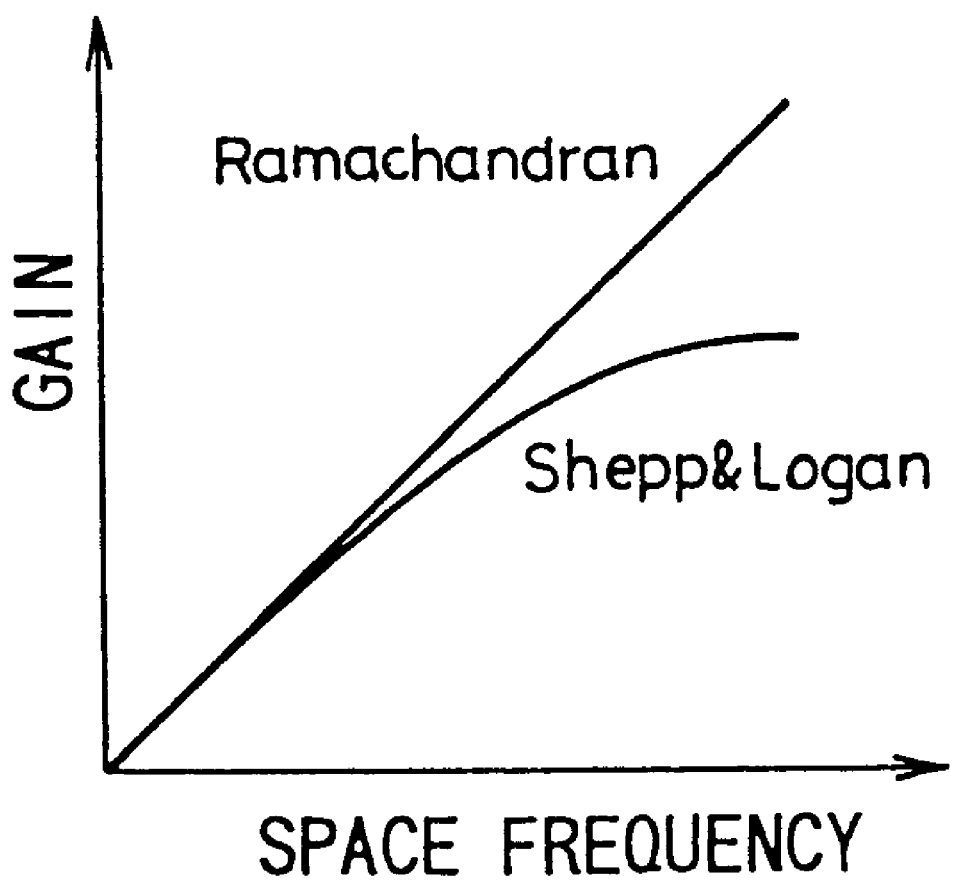
FIG. 4 is a drawing showing the frequency characteristics of typical filter functions used in a filtered back projection method.
Figure 5:
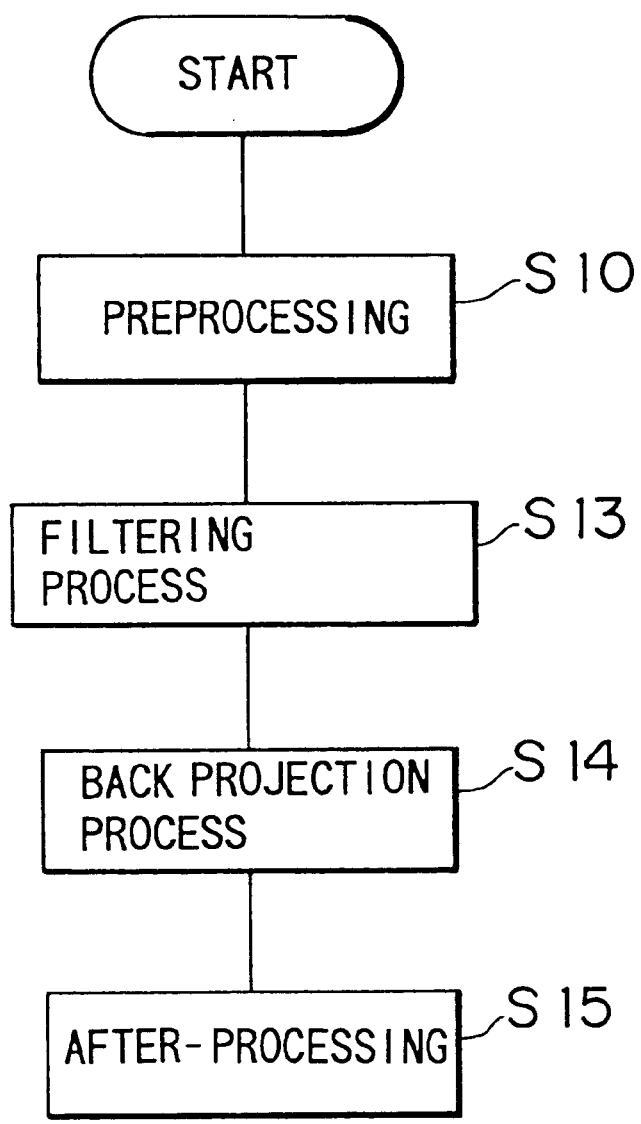
FIG. 5 is a flow chart showing the process of the conventional filtered back projection method.
Figure 6:
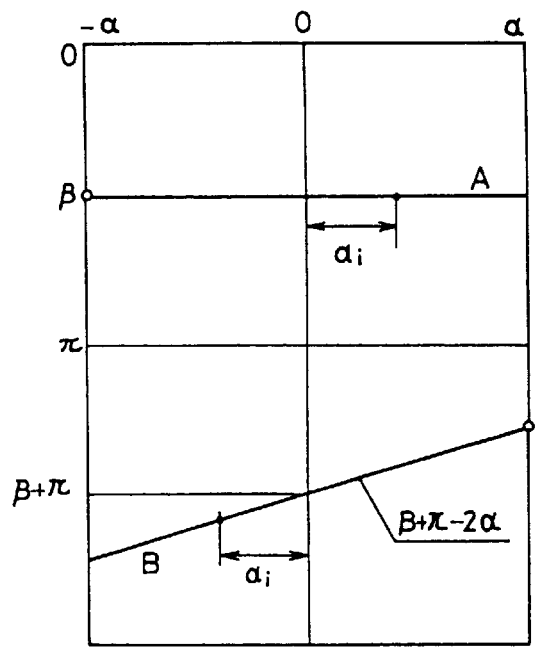
Figure 6:
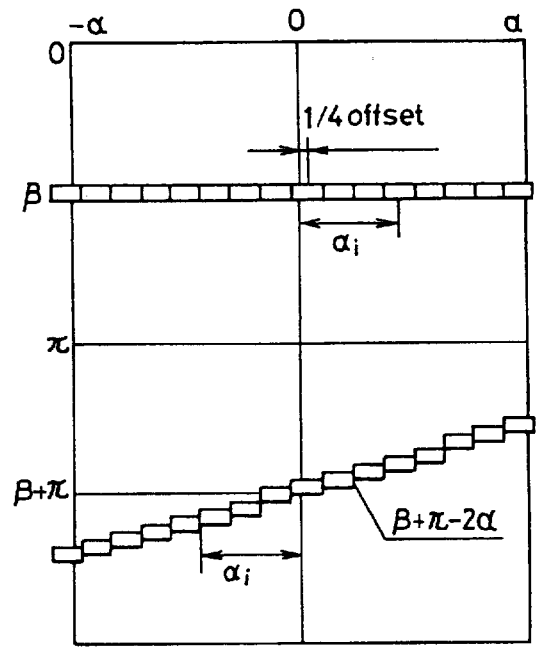

As shown in FIG. 3, an opposition difference data calculating process (Step S30), a distortion component extraction process (Step S31) and a weighting projection calculation process (Step 32) are added between the opposed beam interpolation process (Step S12) and the filtering process (Step S13).

Figure 8:
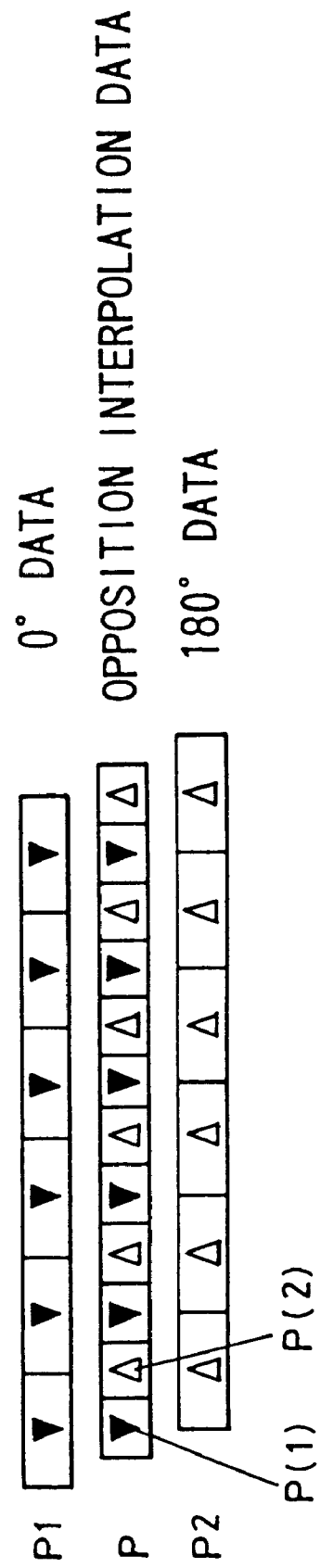
FIG. 8 is a view explaining the interpolation process of the opposed data.

That is, in the second embodiment, the opposition difference data are calculated from the opposition interpolation data which were prepared in Step S12 (Step S30). That is, as shown in FIG. 8, in the opposition interpolation data, the 0° data and the 180° opposed data are alternately provided. Then, using a channel number m and projection number n, the process of the following equation is applied to the opposition interpolation data P(m, n) so that opposition difference data δ(m, n) can be obtained.

$$\delta(m,n)=P(m,n)-\{P(m-1,n)+P(m+1,y)\}/2 \quad (4)$$

Subsequently, similarly to the first embodiment, distortion components PD(m, n) are extracted from the opposition difference data δ(m, n) as shown in the following equation (Step S31):

$$PD(m, n) = \delta(m, n) - \sum_{j=-n}^{n} W_i \cdot \delta(m + i, n) \quad (5)$$

where $W_i$ is a weighting factor of the filter for extracting the distortion components.

Subsequently, the distortion components PD(m, n), which is weighted, is subtracted from the original opposition interpolation data P(m, n), so that opposition interpolation data K(m, n) from which the distortion components are removed, can be obtained (Step S32). When this is expressed in an equation, the following equation is obtained:

$$K(m,n)=P(m,n)-C \cdot PD(m,n). \quad (6)$$

Thus obtained opposition interpolation data K(m, n) are the high precision data of ½ pitch of the cell interval of the ¼ offset detector. In the opposition interpolation data K(m, n), the high-frequency components are emphasized by the filtering process; however, the distortion components are controlled, so that the CT image after the back projection process becomes the high resolution image having the high quality and reduced artifact.

Incidentally, in this embodiment, the distortion component extraction process has been performed by the convolution, however, this process can be performed by the filtering process in the frequency space using a low-pass filter, a high-pass filter, a band-pass filter and so forth. Moreover, in the second embodiment, there has been shown the most simple method, in which the opposition difference data are calculated. However, the 0° data and 180° data, which are at ½ pitch of the cell interval of the ¼ offset detector, may be calculated in advance to calculate the difference data more precisely. Further, an even number channel uses the average value of the 0° data, whereby the accuracy of calculating the opposition difference data is low. Then, there may be thought of such improvements that the distortion components are alternately utilized (no correction is applied to the even number channel). Furthermore, decrease in the resolving power due to this process is controllable by use of the correction factor C, and, even when the effect of controlling the artifact is satisfactory, decrease in the resolving power is several percent.

Furthermore, in the above embodiments, description has been given of that the distortion components, in which the high-frequency components are extracted, is caused to act on the reconstructed original CT image, so that the image having reduced artifact and satisfactory resolving power can be reconstructed. In order to actively remove the aforesaid high-frequency components, the aforesaid high-frequency components are emphasized to take out the distortion components, and the thus taken out distortion components are caused to act on the reconstructed original CT image, so that contribution can be made for obtaining further high resolution CT image.

As has been described hereinabove, according to the present invention, the motion artifacts caused by the high resolution process by use of the ¼ offset detector, movements of the body and internal organs, geometrical distortions and so forth can be controlled, whereby the CT image having reduced artifact and satisfactory resolving power can be reconstructed, so that the function of diagnosis can be improved.

It should be understood, however, that there is no intention to limit the invention to the specific forms disclosed, but on the contrary, the invention is to cover all modifications, alternate constructions and equivalents falling within the spirit and scope of the invention as expressed in the appended claims.

We claim:

1. An X-ray CT system comprising:

a scanner section having an X-ray source and a ¼ offset detector and being rotatable about an isocenter, said X-ray source and said ¼ offset detector facing each other across said isocenter;

opposition difference data calculating means for calculating opposition difference data representing a difference between projection data having a phase difference of 180° from each other, said projection data being acquired through said ¼ offset detector;

opposed beam interpolating means for alternately arranging said projection data having a phase difference of 180° from each other to obtain projection data of the high resolution of ½ pitch of a cell interval of said ¼ offset detector, and for alternately arranging said opposition difference data having the phase difference of 180° from each other to obtain opposition difference data of the high resolution;

image reconstruction calculating means for reconstructing a CT image on the basis of the multi-directional projection data of the high resolution obtained at respective rotational positions of said scanner, and for reconstructing an opposition difference image on the basis of the multidirectional opposition difference data of the high resolution;

distortion component discriminating means for discriminating distortion components in said opposition difference image; and correcting means for correcting the reconstructed CT image by use of said distortion components.

2. An X-ray CT system as set forth in claim 1, wherein said distortion component discriminating means has a filter for discriminating the distortion components from input data.

3. An X-ray CT system comprising:

a scanner section having an X-ray source and a ¼ offset detector and being rotatable about an isocenter, said X-ray source and said ¼ offset detector facing each other across said isocenter;

opposed beam interpolating means for alternately arranging projection data having a phase difference of 180° from each other to obtain projection data of the high resolution of ½ pitch of a cell interval of said ¼ offset detector, said projection data being acquired through said ¼ offset detector;

opposition difference data calculating means for calculating opposition difference data representing a difference between projection data having a phase difference of 180° from each other, said projection data being acquired through said ¼ offset detector;

distortion component discriminating means for discriminating distortion components of said opposition difference data;

correcting means for correcting said projection data of the high resolution by use of said distortion components; and image reconstruction calculating means for reconstructing a CT image on the basis of the projection data of the high resolution corrected by said correcting means.

4. An X-ray CT system as set forth in claim 3, wherein said distortion component discriminating means has a filter for discriminating the distortion components from input data.

5. An X-ray CT system comprising:

a scanner part having an X-ray source and a ¼ offset detector and being rotatable about an isocenter, said X-ray source and said ¼ offset detector facing each other across said isocenter;

projection data acquiring means for acquiring projection data at respective at least two rotational positions of said scanner part through said ¼ offset detector;

CT image reconstruction calculating means for reconstructing a CT image from the projection data; and opposition difference data calculating means for calculating opposition difference data representing a difference between the projection data, wherein said X-ray CT system corrects the reconstructed CT image by use of the opposition difference data.

6. An X-ray CT system as set forth in claim 5, wherein said CT image reconstruction calculating means comprises:

opposition difference image reconstruction calculating means for reconstructing an opposition difference image from the opposition difference data; and CT image correcting means for correcting the reconstructed CT image by use of the opposition difference image.

7. An X-ray CT system as set forth in claim 5, wherein said CT image reconstruction calculating means comprises:

opposition difference image reconstruction calculating means for reconstructing an opposition difference image from the opposition difference data;

distortion component discriminating means for discriminating a distortion component in the opposition difference image; and CT image correcting means for correcting the reconstructed CT image by use of the distortion component.

8. An X-ray CT system as set forth in claim 5, wherein said CT image reconstruction calculating means comprises:

projection data correcting means for correcting the projection data by use of the opposition difference data;

wherein said CT image reconstruction calculating means reconstructs the CT image from the corrected projection data.

9. An X-ray CT system as set forth in claim 5, wherein said CT image reconstruction calculating means comprises:

distortion component discriminating means for discriminating a distortion component in the opposition difference data; and projection data correcting means for correcting the projection data by use of the distortion component, wherein said CT image reconstruction calculating means reconstructs the CT image from the corrected projection data.

10. An X-ray CT system as set forth in claim 5, wherein said opposition difference data calculating means calculates the opposition difference data representing the difference between the projection data having a phase difference of 180° from each other.

* * * * *